US006990708B2

(12) United States Patent
Rosa et al.

(10) Patent No.: US 6,990,708 B2
(45) Date of Patent: Jan. 31, 2006

(54) STEAM CLEANING APPARATUS

(75) Inventors: Carlo Rosa, Lecco (IT); Roberto Bargagna, Titignano Cascina (IT)

(73) Assignee: Ariete S.p.A., (IT)

( * ) Notice: Subject to any disclaimer, the term of this patent is extended or adjusted under 35 U.S.C. 154(b) by 393 days.

(21) Appl. No.: 10/319,597

(22) Filed: Dec. 16, 2002

(65) Prior Publication Data

US 2003/0115711 A1    Jun. 26, 2003

(30) Foreign Application Priority Data

Dec. 21, 2001   (IT)   ............................ GE2001A0101

(51) Int. Cl.
  *A47L 5/00*        (2006.01)
  *A47L 11/00*       (2006.01)
  *F17C 7/04*        (2006.01)
(52) U.S. Cl. .................... 15/320; 392/404; 392/405
(58) Field of Classification Search .......... 15/320–322, 15/344; 392/394–406
  See application file for complete search history.

(56) References Cited

U.S. PATENT DOCUMENTS

| 5,920,952 A | * | 7/1999 | Baldacci | ...................... 15/320 |
| 6,148,144 A | * | 11/2000 | Milanese | ..................... 392/405 |
| 6,289,551 B1 | * | 9/2001 | Basile | .......................... 15/320 |
| 6,571,421 B1 | * | 6/2003 | Sham et al. | ................... 15/320 |
| 6,584,990 B2 | * | 7/2003 | Shaw | ......................... 134/105 |

FOREIGN PATENT DOCUMENTS

| EP | 0 253 910 | * | 1/1988 |
| IT | GE20010000027 |  | 3/2003 |

\* cited by examiner

*Primary Examiner*—Terrence R. Till
(74) *Attorney, Agent, or Firm*—Stites & Harbison PLLC; Marvin Petry

(57) ABSTRACT

Steam cleaning apparatus, comprising an upper handle, an intermediate pole and a bottom head for production and supplying of steam, provided with an instantaneous steam generator, a water reservoir housed on the top of said pole in the region of the handle, a duct for transferring the water from said reservoir to said head and a water loading device housed on an associated loading mouth formed above said reservoir, further comprising a steam regulating device provided with a fixed bushing having a hollow bottom end sealingly engaged on the top end of a sectional pole and a valve body fixed inside said bushing, the top part of said valve body being sealingly engaged on a discharge mouth of said reservoir and provided with a through-hole able to be opened and closed in an adjustable manner by a valve which can be actuated on the outside of the device by means of suitable means movable with respect to said bushing.

9 Claims, 4 Drawing Sheets

STEAM CLEANING APPARATUS

BACKGROUND AND SUMMARY OF THE INVENTION

The present invention relates to a steam apparatus for cleaning horizontal surfaces, in particular floors.

As is known, steam cleaning apparatus exist, comprising an upper handle, an intermediate pole and a bottom head housing a sliding unit which supplies the steam to a rag, a cloth or the like, which is fixed to said sliding unit. The water necessary for production of the steam is supplied to said head by means of pipes which pass inside or outside the pole and is drawn from a reservoir which may be located directly inside the head, inside the handle or outside thereof. In all these cases, the bottom head has a heater or boiler which converts the water into steam. One of the main drawbacks of this apparatus is the difficulty in regulating the quantity of steam which is to be produced by the sliding unit for cleaning. This heater, moreover, increases considerably the overall volume and reduces the compactness of the apparatus.

The object of the present invention is to overcome the drawbacks of the known apparatus mentioned above, by means of a steam cleaning apparatus which allows the user the possibility of regulating the quantity of steam produced by the head, which is compact and the dimensions of which may be varied according to needs.

This object is achieved by the present invention by means of a steam cleaning apparatus, comprising an upper handle, an intermediate pole and a bottom head for production and supplying of steam, provided with an instantaneous steam generator, a water reservoir housed on the top of the pole in the region of the handle, a duct for transferring the water from this reservoir to said head and a water loading device housed on an associated loading mouth formed above this reservoir; said apparatus comprises a steam regulating device provided with a fixed bushing having a hollow bottom end sealingly engaged on the top end of the sectional pole and a valve body fixed inside this bushing; the top part of this valve body is sealingly engaged on a discharge mouth of said reservoir and is provided with a through-hole able to be opened and closed in an adjustable manner by a valve which can be actuated on the outside of the device by means of suitable means movable with respect to said bushing.

As regards the description of said cleaning head, this instantaneous steam generator and in general the bottom part of the cleaning apparatus, reference should be made to the text of the description of the Italian Utility Model patent application Serial Number GE2001U00027 filed on Sep. 26, 2001, in the name of the Italian Joint Stock Company ARIETE S.p.A. at Macrolotto, Prato, Italy.

BRIEF DESCRIPTION OF THE DRAWINGS

Further objects and advantages of the present invention will be understood more clearly during the course of the following description, considered by way of a non-limiting example and with reference to the accompanying drawings, in which.

DESCRIPTION OF THE PREFERRED EMBODIMENT OF THE INVENTION

Figure 1:
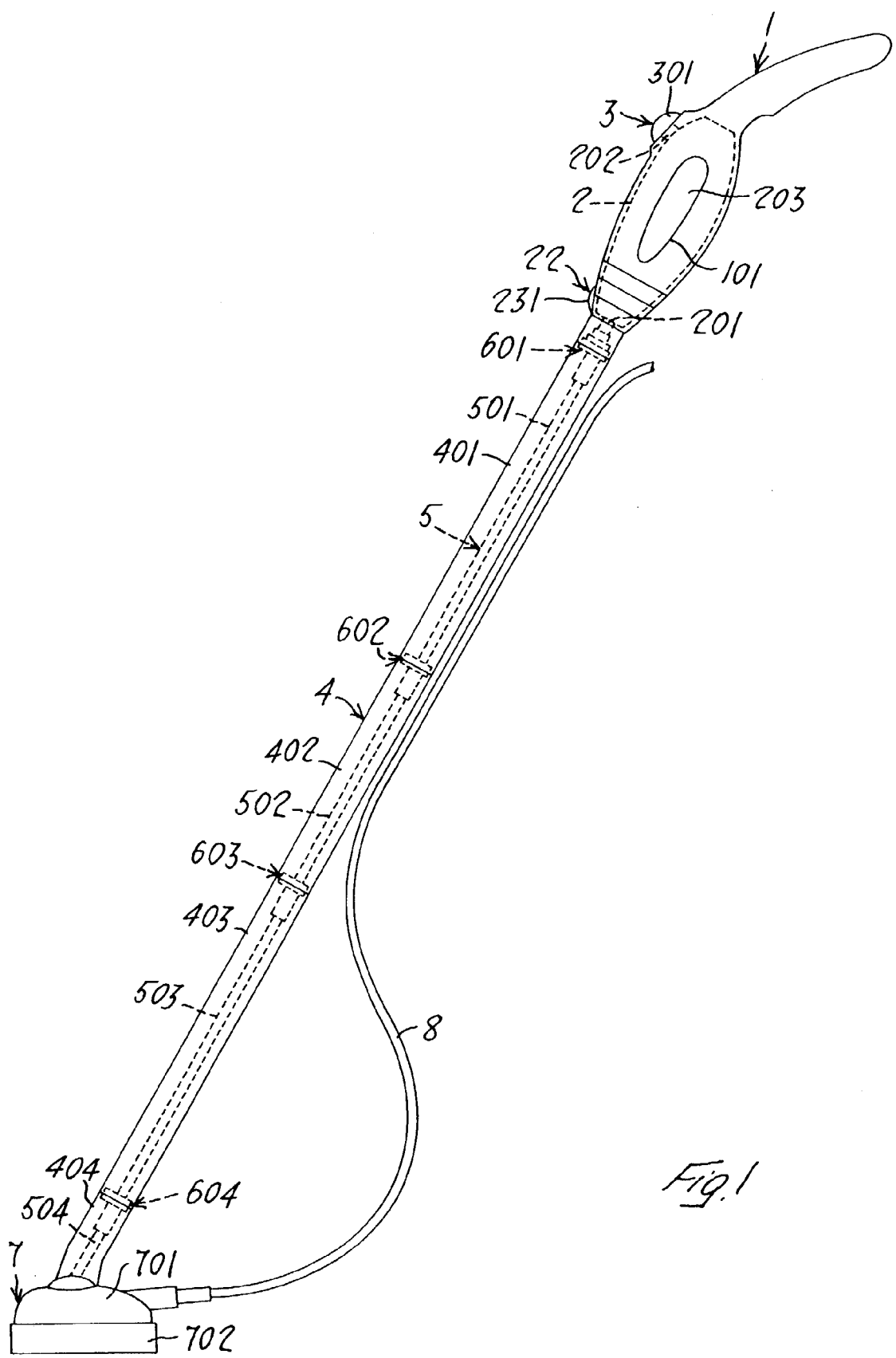
FIG. 1 shows a side view of a steam cleaning apparatus according to the present invention provided with a water loading device and steam regulating device, which are housed in the region of an upper handle of a sectional pole.

With reference to the accompanying drawings, FIG. 1 shows a steam cleaning apparatus according to the present invention, comprising a handle 1 inside which a water storage reservoir 2 is housed. This handle 1 also houses internally a water loading device 3 provided with associated cap 301 and a device 22 for regulating the steam produced by an instantaneous steam generator housed inside a bottom cleaning head 7. This loading device 3 is positioned opposite an upper mouth 202 for loading the water inside said reservoir 2, while said regulating device 22 is positioned opposite a bottom mouth 201 for discharging the water from said reservoir 2. The handle 1 comprises, in the vicinity of its sides, two openings 101 which render visible two sections 203 of the reservoir 2, which may be made of transparent material for verification of the water level inside the reservoir 2 or, alternatively, the reservoir itself may be made of transparent material. A sectional pole 4 is connected in a known manner to the bottom end of the handle 1 and consists, in this example of embodiment, of four tubular elements 401, 402, 403, 404 housing a water flow duct 5 composed of four tubular sections 501, 502, 503, 504.

Obviously, both the tubular elements 401–404 and the tubular sections 501–504 could be of a different number and have different dimensions from that illustrated in the figure by way of example, depending on the aesthetic requirements and convenience of use of the apparatus. These tubular sections 501–504 are connected together and to the reservoir 2 by means of sealed joints 601, 602, 603, 604; for example, the tubular section 501 is connected at the top to the discharge mouth 201 of the reservoir 2 by means of a first sealed joint 601 and, at the bottom, is connected to the tubular section 502 by means of a second sealed joint 602. The final tubular element 404 of the pole 4 is connected directly to the cleaning head 7, which comprises an upper casing 701 and a removable bottom sliding unit 702 made of impact-resistant material. An electrical power cable 8 for steam operation of the present apparatus is connected to this cleaning head 7.

Figure 2:
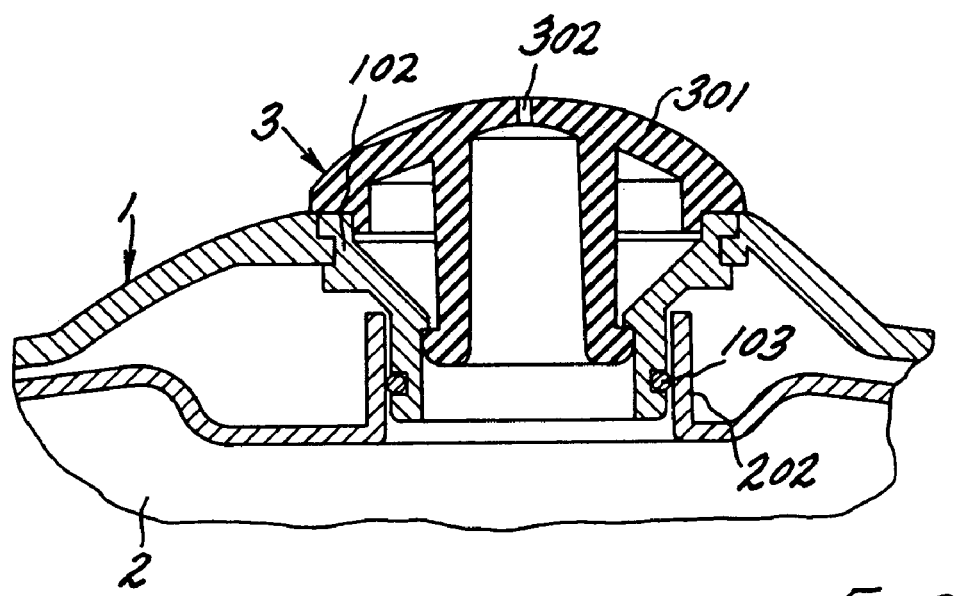
FIG. 2 shows a lateral section, on a larger scale, through the water loading device of the apparatus according to FIG. 1.

FIG. 2 shows in detail the water loading device 3 engaged on the loading mouth 202 of the reservoir 2. This device 3 comprises a cap made of elastomer material 301 and provided with an upper hole 302 for entry of the air under atmospheric pressure inside the reservoir 2, so as to allow descent of the water from this reservoir 2 to the head 7, when required. This cap 301 is inserted in a funnel-shaped seat 102 which is fixed at the top on the handle 1 and at the bottom is inserted, by means of suitable sealing means 103, inside the loading mouth 202 of the reservoir 2.

Figure 5:
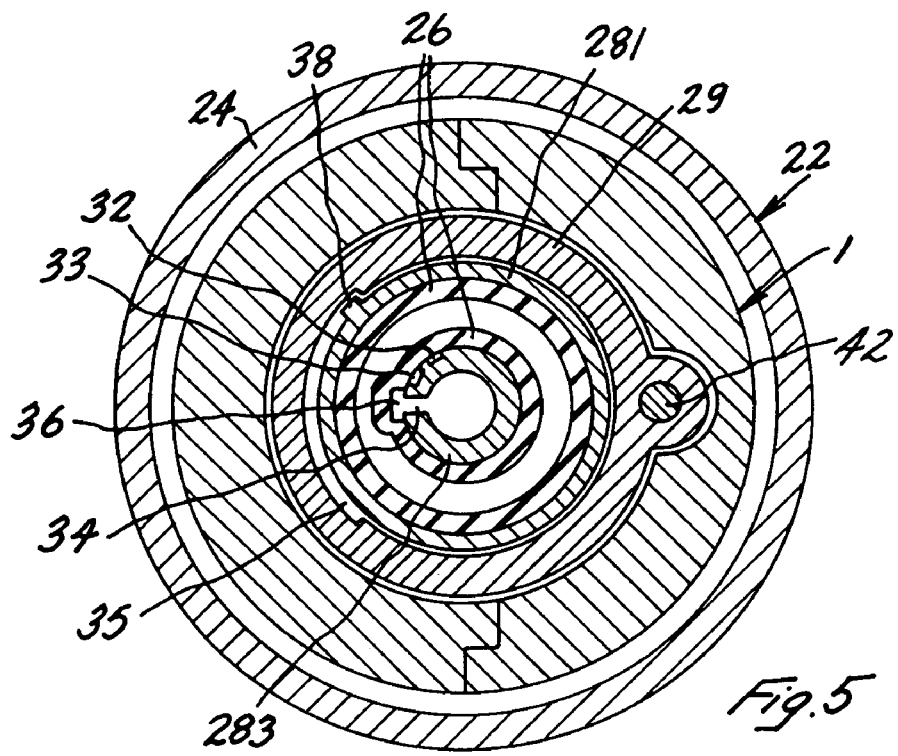
FIG. 5 shows a cross section, on a larger scale, through the steam regulating device of the apparatus according to FIG. 1 in the fully open position.
Figure 3:
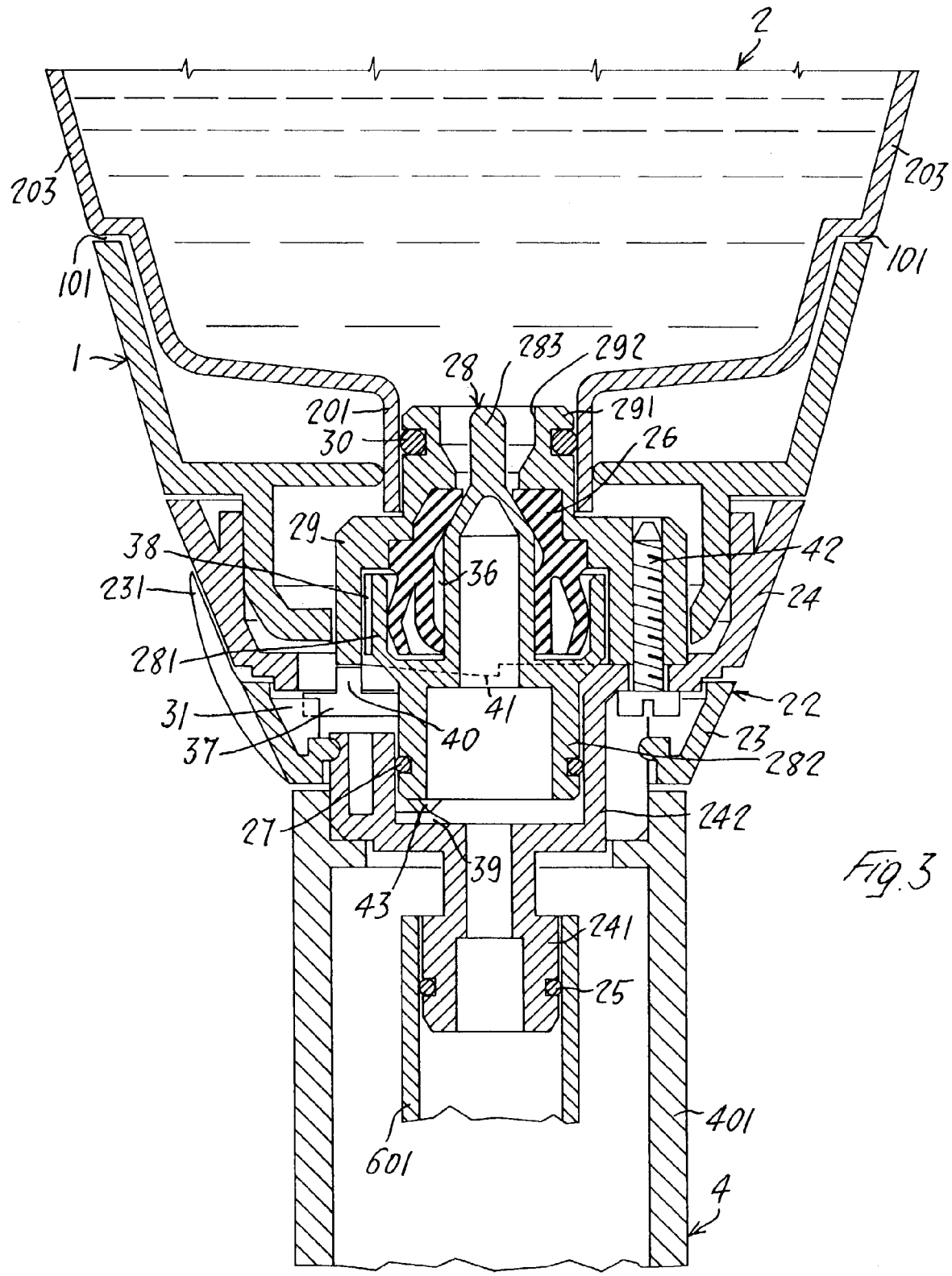
FIG. 3 shows a lateral section through the steam regulating device of the apparatus according to FIG. 1 in the closed position.
Figure 4:
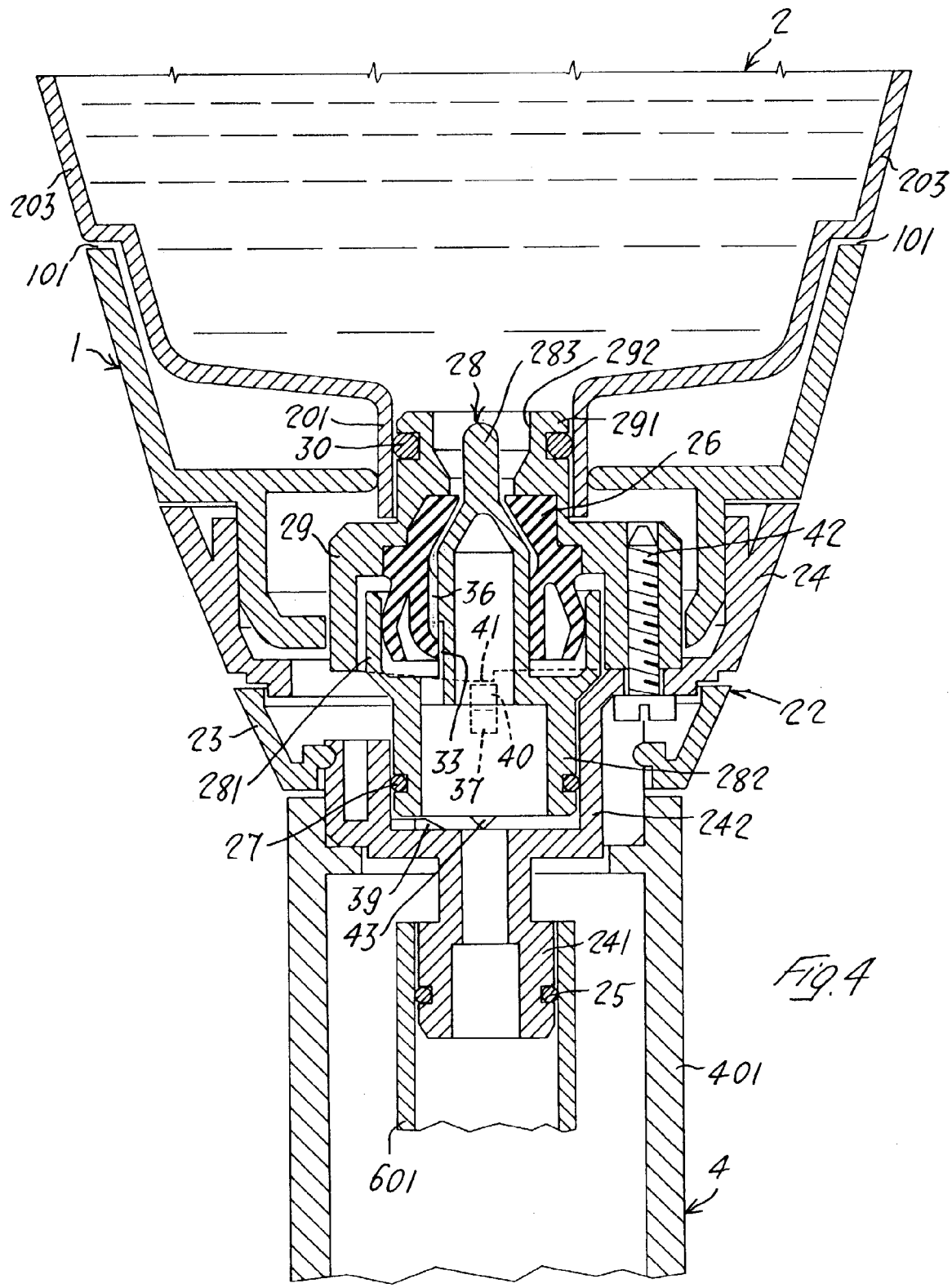
FIG. 4 shows a lateral section through the steam regulating device of the apparatus according to FIG. 1 in the half-open position.

FIGS. 3, 4 and 5 show in detail the steam regulating device 22 housed opposite the mouth 201 for discharging the water from the tank 2. This device 22 comprises a fixed bushing 24 with a substantially frustoconical shape, the cylindrical bottom end 241 of which, having a smaller cross section, is inserted, via sealing means 25, inside the joint 601 of the first tubular element 401 of the sectional pole 4 and the top part of which, having a larger cross section, receives the bottom end of the handle 1. A valve body 29 with a substantially cylindrical shape is fixed to said bushing 24 by means of screws 42, only one of which is visible in the figures. The top part 291 of said valve body 29 is inserted, by means of sealing means 30, inside the discharge mouth 201 of the reservoir 2 and comprises a frustoconical through-hole 292 inside which the conical needle 283 for regulating a valve 28 is inserted. This valve 28 comprises, at the bottom, a cylindrical shaft 282 inserted, by means of sealing means 27, inside an associated cylindrical seat 242 formed above the bottom end 241 of the bushing 24 and coaxial therewith. A cup-shaped cylindrical housing 281, inside which a conical seal 26 preferably made of elastomer material is inserted, is formed above said shaft 282 and around the body of the conical needle 283. A regulating ring 23, which is rotatable with respect to said bushing 24, is provided around the fixed bushing 24, at the top end of the first tubular element 401. This ring 23 comprises externally a reference notch 231 and internally a contact element 31 engaged with a first tongue 37 formed radially in the valve 28, at the height of the top part of its bottom shaft 282. Said valve 28 comprises, at the height of the cylindrical housing 281, a second radial tongue 38 which is engaged inside a track 35 in the form of a circle arc (FIG. 5) formed inside the valve body 29; this track 35 defines, substantially, the length of the angle of rotation of the regulating ring 23 around the fixed bushing 24. Above said first radial tongue 37, said valve 28 comprises a substantially vertical tooth 40 engaged on a surface 41 inclined downwards and formed on the top end of the valve body 29. On the other hand the bottom part of the shaft 282 of the valve 28 has, formed on it, a pin 43 able to engage with an inclined track 39 fixed inside the base of the cylindrical seat 242 formed in the fixed bushing 24. As can be seen from FIG. 5, the body of the conical needle 283 of the valve 28 comprises three longitudinal grooves 32, 33, 34 which are able to face a longitudinal channel 36 formed inside the seal 26 made of elastomer material. These grooves represent three different degrees of opening the regulating device 22, i.e. the groove 32 represents a minimum degree of opening, the groove 33 represents an intermediate degree of opening, while the groove 34 represents a maximum degree of opening.

Let us consider operation of the regulating device 22 on the basis of the figures described hitherto. In the position shown in FIG. 3, the regulating device closes off the flow of the water from the reservoir 2 to the first tubular element 401 of the sectional pole 4: in this case the longitudinal channel 36 formed in the internal wall of the seal 26 does not face any of the longitudinal grooves 32–34 formed along the body of the regulating needle 283 of the valve 28, the pin 43 of the shaft 282 is located above the track 39 formed in the bushing 24 and the second tongue 38 of the cylindrical housing 281 of the valve is at the end of the track 35 of the valve body, basically in the opposite position to that shown in FIG. 5. In this situation, the reference notch 231 of the regulating ring 23 will indicate that the device 22 is closed and there is no water flowing and therefore there will be no production of steam by the cleaning head of the apparatus. By rotating the ring 23 about the fixed bushing 24, the contact element 31, engaged with the first tongue 37 of the valve 28, will cause rotation of said valve 28 which is lowered vertically since the tooth 40 runs along the inclined surface towards the bottom 41 of the valve body 29. This rotation of the needle 283 also causes a displacement of the second tongue 38 of the valve along the track 35 of the valve body 29 as far as the position where one of the longitudinal grooves 32–34 is facing the channel 36 of the seal 26. FIG. 4 illustrates the case where there is intermediate opening of the regulating device and therefore it is the central channel 33 which faces said channel 26. In this situation the water from the reservoir 2 enters into the frustoconical hole 292, through the duct formed by said groove 33 and said channel 36, passes through the shaft 282, the bottom end 241 of the bushing 24 and then reaches the first tubular element 401 of the sectional pole 4 from where it is conveyed to the instantaneous steam generator which will consequently produce an intermediate steam flow. In order to increase the production of steam to the maximum flow, it is sufficient to rotate the ring until it reaches the position shown in FIG. 5, with the groove 34 with a larger cross section facing the channel 36 of the seal 26 and the second tongue 38 of the valve having reached the end of its travel inside the track 35 of the valve body 29. In order to interrupt the steam supply, it is necessary to interrupt the supply of water to the pole 4 from the reservoir 2: therefore by rotating the ring 23 in the opposite direction to the previous direction, so as to pass from the condition shown in FIG. 4 into that shown in FIG. 3, the valve 28—and in particular its bottom pin 43 which travels up the track 39 formed in the bushing 24—is made to rotate again. This upwards displacement of the pin 43 causes raising of the valve 28 and in particular the needle 283 which closes again the hole 292 and therefore interrupts the water flow.

As it is possible to understand from the above description, the advantages resulting from use of a steam cleaning apparatus according to the embodiment shown above by way of example are numerous, as are the constructional forms which may be adopted in order to obtain these advantages without departing from the scope of the accompanying claims.

We claim:

1. Steam cleaning apparatus, comprising an upper handle, an intermediate pole and a bottom head for production and supplying of steam, provided with an instantaneous steam generator, a water reseivoir housed on the top of said pole in the region of the handle, a duct for transferring the water from said reservoir to said head and a water loading device housed on an associated loading mouth formed above said reservoir, further comprising a steam regulating device provided with a fixed bushing having a hollow bottom end sealingly engaged on the top end of a sectional pole and a valve body fixed inside said bushing, the top part of said valve body being sealingly engaged on a discharge mouth of said reservoir and provided with a through-hole able to be opened and closed in an adjustable manner by a valve which can be actuated on the outside of the device by means for moving said valve with respect to said bushing.

2. Steam cleaning apparatus according to claim 1, in which said valve comprises at the top a conical regulating needle inserted inside said through-hole, at the bottom a cylindrical shaft sealingly engaged inside a cylindrical seat formed in the bushing and laterally a cylindrical housing coaxial with said needle, a seal being inserted in said housing and having, formed in it, a water flow channel able to co-operate with one or more grooves formed in a side wall of said needle.

3. Steam cleaning apparatus according to claim 2, in which said seal is made of elastomer material.

4. Steam cleaning apparatus according to claim 2, in which a shaft of said needle comprises a first radial tongue engaged with a contact element formed inside a regulating ring fixed so as to be able to rotate about a body of the fixed bushing, said ring being able to cause rotation of said valve and said valve being provided with means for alternating vertical displacement, co-operating with suitable guides formed in the bushing and in the valve body.

5. Steam cleaning apparatus according to claim 4, in which said valve body has, formed in it, an arc-shaped track inside which a second radial tongue formed on the outside of said cylindrical housing coaxial with the needle.

6. Steam cleaning apparatus according to claim 2, in which a substantially vertical tooth engaged along with an inclined surface formed at the top end of the valve body is formed on the top of a first radial tongue, said tooth, during rotation of a regulating ring in the opening condition, being able to allow a lowering of the valve and therefore movement of the conical needle away from the through-hole of the valve body.

7. Steam cleaning apparatus according to claim 2, in which a projecting pin engaged with a track formed on a base of the cylindrical seat provided in the bushing is formed on the bottom of the shaft of the valve, said pin, during rotation of a regulating ring in the closing condition, being able to allow a raising of the valve and therefore a movement of the conical needle towards the through-hole of the valve body.

8. Steam cleaning apparatus according to claim 2, in which said grooves formed on the side well of the conical needle are made with a gradually increasing cross section so as to form, together with a channel of the seal, water flow passages with a gradually increasing cross section depending on the degree of rotation of a regulating ring.

9. Steam cleaning apparatus according to claim 1, in which a regulating ring comprises externally a reference notch which allows the user to determine the desired degree of opening of the device for regulating the steam supply.

* * * * *